Feb. 9, 1960 W. SMEULERS 2,924,654

CIRCUIT ARRANGEMENT TO DERIVE A SYNCHRONISING VOLTAGE FOR THE FRAME SAWTOOTH GENERATOR

Filed July 20, 1956

INVENTOR
WOUTER SMEULERS

BY [signature]
AGENT

United States Patent Office 2,924,654

Patented Feb. 9, 1960

2,924,654

CIRCUIT ARRANGEMENT TO DERIVE A SYNCHRONISING VOLTAGE FOR THE FRAME SAWTOOTH GENERATOR

Wouter Smeulers, Eindhoven, Netherlands, assignor, by mesne assignments, to North American Philips Company, Inc., New York, N.Y., a corporation of Delaware Application July 20, 1956, Serial No. 599,162

Claims priority, application Netherlands August 10, 1955

3 Claims. (Cl. 178—7.3)

Figure 1:
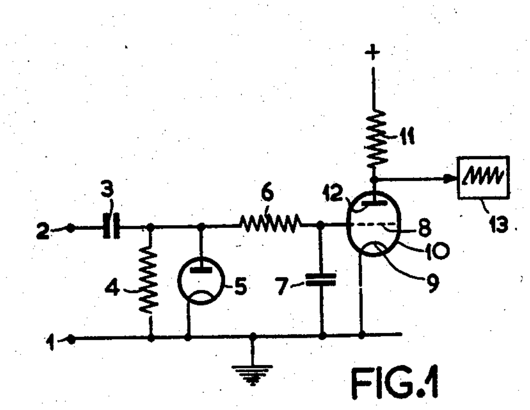

The invention relates to a circuit arrangement to derive a synchronising voltage for the frame sawtooth generator of a television receiver from the detected television signal, which contains the direct-current component and which has positive-going synchronising pulses and negative-going image signals.

In known circuit arrangements to derive a synchronising voltage for the frame sawtooth generator it is common practice to remove first the image signals from the detected television signal, which contains the direct-current component and which has positive-going synchronising pulses and negative-going image signals. To this end the detected television signal is usually fed with the said polarity, via a capacitor and a leak resistor, to the control-grid of a tube. At this control-grid the direct-current component is firstly reintroduced by peak detection and secondly the image signal is shifted beyond the cut-off point of the anode-current—grid-voltage characteristic curve of the tube, so that only during the occurrence of synchronising pulses current is drawn by the tube. Then by integration or differentiation the synchronising voltage for the frame sawtooth generator is derived from the mixture of synchronising pulses thus separated out.

It is also known to feed the mixture of synchronising pulses separated out in the manner described above to a control-electrode of a tube and to feed the voltage obtained from this mixture by integration or differentiation to a further control-electrode.

However, all the said methods have the disadvantage that the synchronising voltage obtained is fairly sensitive to interference pulses.

The circuit arrangement according to the invention mitigates this disadvantage and has the feature that the aforesaid television signal is fed to an integrating network, the time constant of which is lower than 3 line periods, preferably lower than 1 line period and the output voltage of which is supplied to a control-electrode of an amplifier element, from the output circuit of which is obtained the synchronising voltage for the frame sawtooth generator.

Consequently in the circuit arrangement according to the invention the whole signal, still comprising the image signal, is integrated with a short time constant. It will be evident hereinafter that the synchronisation of the frame sawtooth generator is thus substantially not affected by interference pulses.

The circuit arrangement according to the invention will be described more fully with reference to the drawing.

Figure 2:
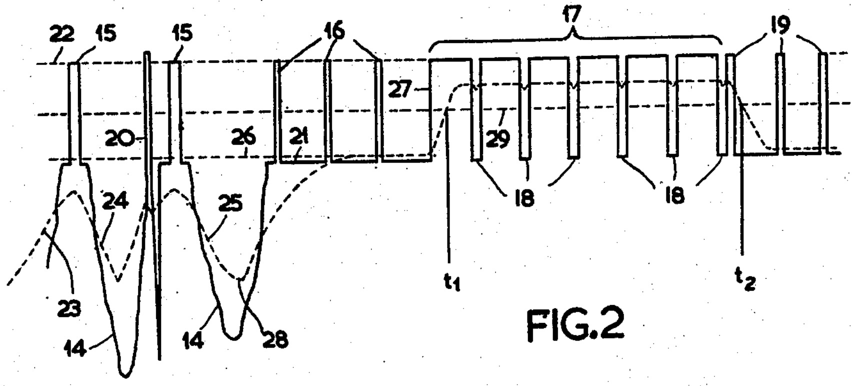
Figure 3:
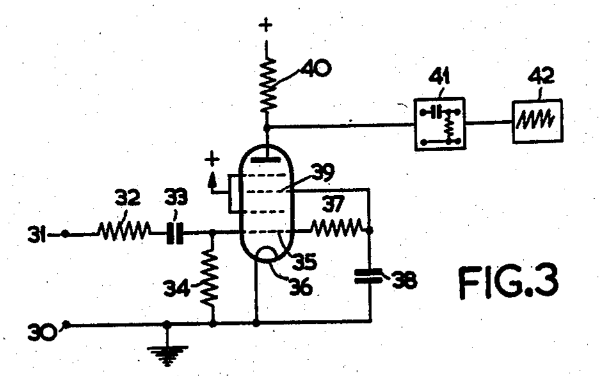

Fig. 1 shows a first embodiment of the circuit arrangement according to the invention, Fig. 2 shows the shapes of various voltages occurring in the arrangement shown in Fig. 1, and Fig. 3 shows a variation of the arrangement shown in Fig. 1.

Between the input terminals 1 and 2 of the circuit arrangement shown in Fig. 1 provision is made of a series combination of a capacitor 3 and a resistor 4. A diode 5, the cathode of which is connected to the earth-connected input terminal 1, is connected in parallel with the resistor 4. An integrating network, consisting of the resistor 6 and the capacitor 7 is connected in parallel with the resistor 4 and the diode 5. The capacitor 7 is connected between the control-grid 8 and the cathode 9 of a tube 10. The anode circuit of the tube 10 includes the resistor 11. The anode 12 of the tube 10 is coupled with the input circuit of the frame sawtooth generator 13. To the input terminals 1, 2 is supplied a television signal of the waveform indicated in Fig. 2 by the full line. This television signal contains negative-going image signals 14, positive-going line synchronising pulses 15, positive-going pre-equalization 16, of which only three are indicated and which have double the line frequency, a positive-going frame synchronising pulse 17, interrupted by pulses 18 of double the line frequency, and positive-going postequalization pulses 19. The supplied signal may furthermore contain interference pulses, of which only one is indicated at 20 and which occurs during the image signal 14, these interference pulses may, of course, also occur during the synchronising pulses or intermediate thereof, when the signal has the black level 21.

With the aid of the capacitor 3, the resistor 4 and the diode 5 the direct-current component of the supplied television signal is re-introduced in known manner, the peaks of the synchronising signals lying then on substantially the same level 22, which, in this case, since the cathode of the diode 5 is connected to earth, corresponds to 0 volt.

It should be noted that owing to the occurrence of strong interference pulses, the peaks of the synchronising pulses do not lie on the same level, but the differences then occurring may be reduced to a comparatively great extent, if the interferences are already limited in preceding stages of the television receiver to the level of the peaks of the synchronising signals. However, the disturbing effect of these interference pulses is then not yet eliminated, since, as is indicated in Fig. 2 at 20, these pulses extend to the amplitude range of the synchronising pulses between the levels 21 and 22. In order to suppress these interferences, the signal with the direct-current component is fed to the integrating network consisting of the resistor 6 and the capacitor 7 with a low time constant.

The image signal 14 extends far in a negative sense, so that the integrated image signal has substantially the course of the broken line indicated at 23, 24 and 25. The interference pulse occurring at 20 will produce only a very small ripple in the course of the integrated voltage, so that the integrated voltage remains below the black level 21. It should be noted that it may, of course, also occur that the image signal fails or corresponds to 100% black. In this case the level of the integrated voltage just lies over the black level, as is indicated by the broken line 26. If an interference pulse occurs, it produces only a small rise and drop of the course of the integrated voltage. This particularly applies to the case in which the interference pulse is limited previously substantially to the level 22, since then the mean value of the interference pulses obtained after integration becomes strongly negative.

At the first pre-equalization pulse the value of the integrated voltage is also determined by the image content of the preceding line of the image signal. Then the integrated voltage rises rapidly to the level 26, the velocity being determined by the value of the time constant of the integrating network. This time constant must be chosen to be such that the integrated voltage always reaches the level 26 before the leading edge 27 of the frame synchronising pulse 17 occurs, since otherwise the instant when the integrated voltage starts rising after the leading edge 27, varies with the image content, i.e. with the starting point 28 of the preceding image signals. After the leading edge 27 the integrated voltage rapidly exceeds the value 29, corresponding to the cut-off point of the tube 10. At the end of the frame pulse 17, the value of the integrated voltage drops rapidly below the level 29.

Consequently, the tube 10 will draw current only during the period from $t_1$ to $t_2$, during which the amplitude of the integrated signal exceeds the level 29.

The time constant of the integrating network 6, 7 is lower than 3 line periods, but preferably lower than 1 line period. With a time constant of 1.5 line periods it appeared that even very strong interference pulses did not affect the output voltage of the tube 10. This output voltage appeared to be directly suitable for synchronisation of the frame sawtooth generator. However, in this output voltage the interruption pulses 18 fail, so that synchronisation on a trailing edge of such an interruption pulse cannot be carried out.

This is, however, the case in the arrangement shown in Fig. 3. The same television signal is fed via the terminals 30, 31, a resistor 32, a grid capacitor 33 and a grid leak resistor 34 to the first control-grid 35 of the hexode tube 36. The television signal across the resistor 34 is furthermore supplied to an integrating network, consisting of a resistor 37 and a capacitor 38, which is connected between the second control-grid 39 and the cathode of the tube. At the first control-grid 35 peak detection takes place, so that across the resistor 34 occurs the signal containing the direct-current component. The series resistor 32 serves, in known manner, to reduce the amplitude of the interference pulses occurring at the control-grid 35. The signal containing the direct-current component is integrated and the integrated signal governs the anode current of the tube 36 in the same manner as described with reference to Figs. 1 and 2. However, at the first control-grid 35 is separated also the image signal, so that only during positive-going synchronising pulses anode current can pass the tube owing to the effect of the first control-grid.

The two control-voltages together have the effect that only during the period from $t_1$ to $t_2$ anode current passes through the tube and the output signal will be a replica of the synchronising pulse 17, including the interruptions 18. The voltage occurring at the anode resistor 40 may then be supplied for example via a differentiating network 41 to the frame sawtooth oscillator 42. It should be noted that the order of succession of the control-grids, to which are supplied the integrated voltage and the television signal itself, is not essential.

What is claimed is:

1. A television synchronizing signal circuit comprising a source of a television signal having periodic line-synchronizing pulses of relatively short duration and periodic frame-synchronizing pulses of relatively long duration with respect to said line-synchronizing pulses and image signal components occurring between said line-synchronizing pulses, said synchronizing pulses comprising positive-going excursions of said signal with respect to a given reference level of said television signal and said image signal components comprising negative-going excursions of said signal with respect to said given reference level, an amplifier device having a control electrode and an output electrode, means for biasing said amplifier device normally in a cut-off condition, and an integrating network connected between said television signal source and said control electrode, and means for applying said television signal to said network with said synchronizing pulse excursion in positive polarity direction to integrate said signal, said integrating network having a time-constant which is lower than 3 periods of said line-synchronizing pulses, whereby the integrated signal which is applied to said control electrode permits said amplifier device to be conductive only during the occurrences of said frame-synchronizing pulses and whereby only the frame-synchronizing pulses appear at said output electrode.

2. A television synchronizing signal circuit comprising a source of a television signal having periodic line-synchronizing pulses of relatively short duration, periodic frame-synchronizing pulses of relatively long duration with respect to said line-synchronizing pulses and image signal components occurring between said line-synchronizing pulses, said synchronizing pulses comprising positive-going excursions with respect to a given reference level of said television signal and said image signal components comprising negative-going excursions of said signal with respect to said given reference level, an amplifier device comprising first and second control electrodes and an output electrode, means for applying said television signal to said first electrode with said synchronizing pulse excursions in positive polarity direction, an integrating network connected between said first and second control electrodes for applying the signal at said first electrode to said second electrode with said synchronizing pulse excursions in positive polarity direction, said integrating network having a time constant which is lower than three periods of said line-synchronizing pulses whereby the integrated signal which is applied to said control electrode permits said amplifier to be conductive only during the occurrences of said frame-synchronizing pulses and whereby only the frame-synchronizing pulses appear at said output electrode.

3. A television synchronizing signal circuit as claimed in claim 2 comprising means responsive to said positive-going synchronizing pulses for blocking the said amplifier device during intervals between said pulses.

References Cited in the file of this patent

UNITED STATES PATENTS 2,219,579 Poch ---------- Oct. 29, 1940
2,539,374 Pourciau ---------- Jan. 23, 1951